Sept. 19, 1933.  B. RUDOLFF  1,927,504
LEVEL
Filed June 30, 1930   2 Sheets-Sheet 1
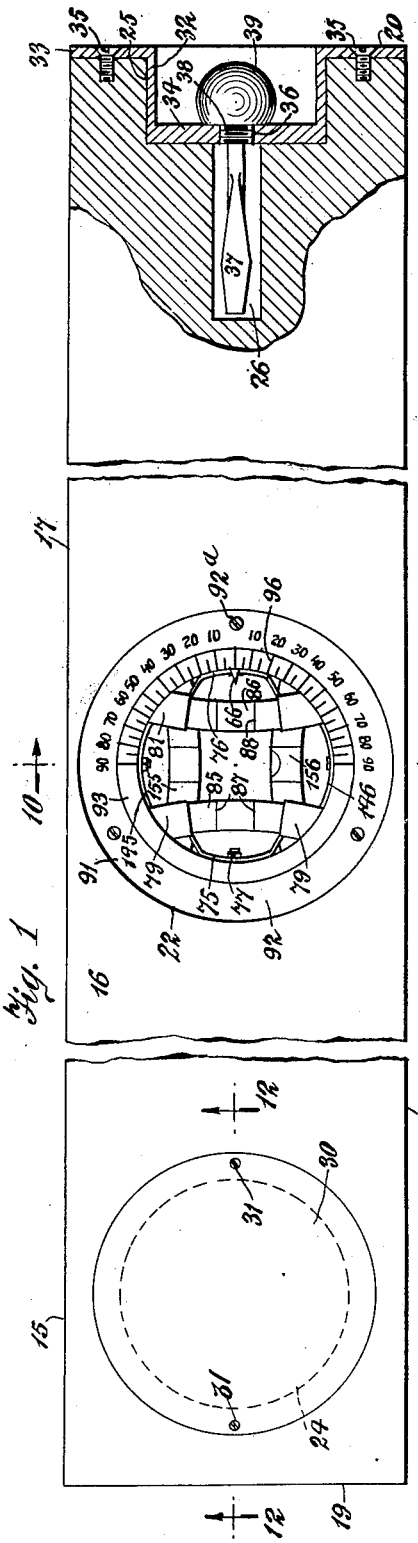
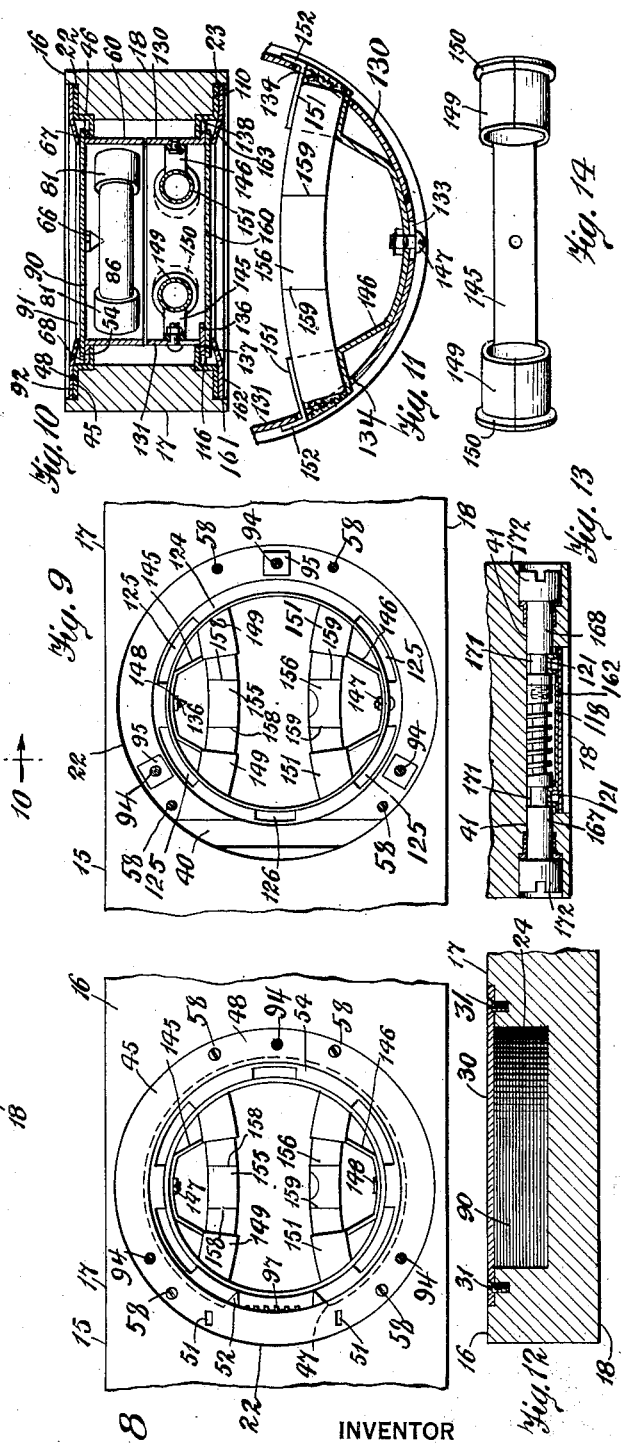
INVENTOR
BARNET RUDOLFF
BY
ATTORNEY Sept. 19, 1933.                B. RUDOLFF                1,927,504
                                  LEVEL
                           Filed June 30, 1930            2 Sheets-Sheet 2
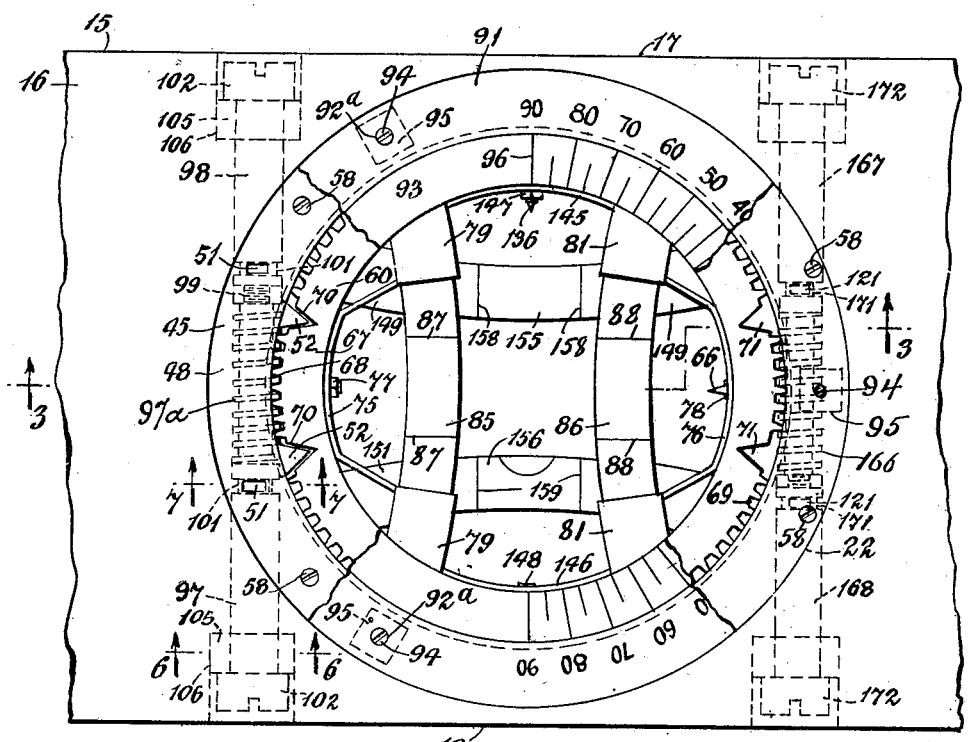
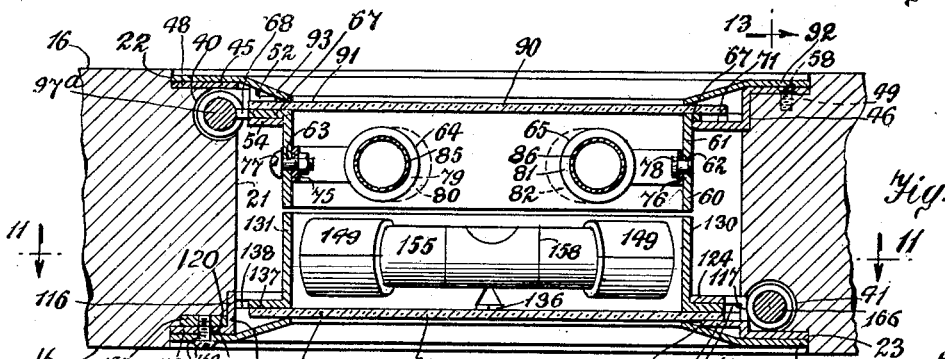
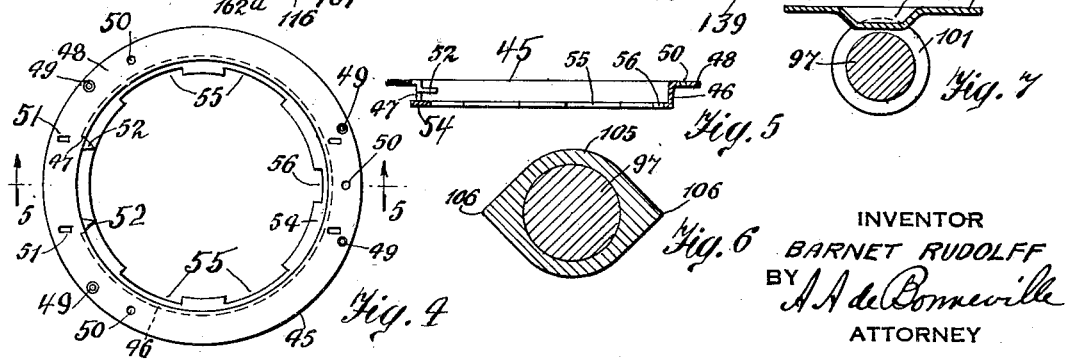
INVENTOR
BARNET RUDOLFF
BY
ATTORNEY Patented Sept. 19, 1933

1,927,504

UNITED STATES PATENT OFFICE 1,927,504

LEVEL

Barnet Rudolff, Bayonne, N. J.

Application June 30, 1930. Serial No. 464,877

7 Claims. (Cl. 33—214)

This invention relates to a level.

The object of the invention is the production of a level, in which pairs of spirit levels can be used for horizontal and vertical surfaces. The second object of the invention is the production of a level having a pair of spirit levels with means for adjusting each pair, and means to adjust the spirit levels of each pair relatively to each other. The third object of the invention is the production of apparatus to maintain the adjusting means of the spirit levels in operative position. The fourth object of the invention is the production of a device which can be used as a level or a plumb.

Fig. 1 represents a side view of the improved level; Fig. 2 shows an enlarged fragmentary portion of Fig. 1 partly broken away; Fig. 3 is a section of Fig. 2 on the line 3, 3; Fig. 4 represents a plan view of a detail; Fig. 5 shows a section of Fig. 4 on the line 5, 5; Fig. 6 is a section of Fig. 2 on the line 6, 6; Fig. 7 shows an enlarged section of Fig. 2 on the line 7, 7; Fig. 8 is a fragmentary portion of Fig. 1 with some of the elements omitted; Fig. 9 is a view similar to Fig. 8 with some elements omitted; Fig. 10 represents a cross section on the line 10, 10 of Fig. 1; Fig. 11 is partial cross section of Fig. 3 on the line 11, 11; Fig. 12 is a cross section on the line 12, 12 of Fig. 1; Fig. 13 indicates a partial cross section on the line 13, 13 of Fig. 3 and Fig. 14 shows an elevation of a detail.

Referring to the drawings the body of the level is indicated at 15 and comprises the side faces 16, the top face 17, the bottom face 18 and the end faces 19 and 20. In the body 15 of the level is formed the main cylindrical opening 21, Fig. 3, with the annular recesses 22 and 23. The cylindrical cavity 24 is formed at one end of said body 15 and extends from one of the faces 16 thereof.

At one end of the body 15 is formed the pocket 25 with the extension 26. The cavity 24 has detachably connected thereto the cover 30 by means of the screws 31. The cavity 24 provides a reservoir for glass covers 90. In the pocket 25 is located the thimble 32 having the flange 33 and the base plate 34. The flange 33 is held in place by the screws 35. The base plate 34 of the thimble 32 has a threaded opening 36 for a screw driver 37 which extends into the extension 26. The screw driver 37 has formed therewith the threaded shank 38. The handle or head of the screw driver is shown at 39. The said screw driver 37 extends into the extension 26, the shank 38 being in threaded engagement with the opening 36. The bottom of the head 39 normally bears on the base plate 34 of the thimble 32. To use the screw driver the user turns the head 39, whereby the shank 38 is disengaged from the opening 36, when the screw driver can be withdrawn from the thimble 32.

Cylindrical shaped cross openings 40 and 41, Fig. 3, are formed in the body 15 of the level.

In the opening 21 is located the supporting ring designated in its entirety by the numeral 45. The said supporting ring 45 comprises the barrel portion 46 having the opening 47. An outer flange 48 extends from the barrel portion 46 and has formed therein the four openings 49 and the three openings 50. Indentations 51 are formed in the flange 48 and pointed lugs 52 extend inwardly from the barrel portion 46. An inner flange 54 extends from the barrel portion 46, and has formed therein the four cut-outs 55 and the cut-out 56. The flange 48 of the ring 45 is located in the annular recess 22 of the opening 21 and is fastened in place by the screws 58, which extend through the openings 49.

A sleeve is designated in its entirety by the numeral 60 and comprises the barrel portion 61 having the opening 62 and the opening 63 elongated in a plane parallel to the side faces 16. Openings 64 and 65 similar to the opening 134 to be described are formed in the barrel portion 61. A pointer 66 extends inwardly from the barrel portion 61. A flange 67 extends from one end of the barrel portion 61 and has formed on its periphery the worm teeth 68 and the oppositely positioned worm teeth 69. Oppositely positioned triangularly shaped openings 70 and 71 are formed in the flange 67. The sleeve 60 is located in the supporting ring 45 with its flange 67 bearing on the flange 54. To locate the sleeve 60 within the ring 45, the openings 70 are brought in register with the lugs 52.

Similar brackets 75 and 76 are fastened to the barrel portion 61, respectively, by the bolt 77 and the rivet 78. The bolt 77 extends through the opening 63 of the barrel portion 61, which opening is elongated in a plane parallel to the faces 16 and the rivet 78 extends through the opening 62 of said ring portion.

With the bracket 75 is formed a pair of split sleeves 79 similar to 149 to be described and which have each formed therewith the flange 80. With the bracket 76 is formed a pair of split sleeves 81 similar to 79 and which have each formed therewith the flange 82. The sleeves 79 are supported in the openings 64 of the barrel portion 61 and the sleeves 81 are supported in the openings 65 of the said barrel portion 61. A curved spirit level tube 85 has its ends supported in the sleeve 79 and a curved spirit level tube 86 has its ends supported in the sleeves 81. Lines 87 are formed in the outer surface of the spirit level tube 85 and lines 88 are formed on the outer surface of the tube 86. A glass cover 90 is supported on the flange 67 of the sleeve 60 and bears up against the lugs 62. A ring 91 having the flat portion 92 with the openings 92a, and the bevelled portion 93 is located in the recess 22 of the opening 21, and is held in place by means of the screws 94, which extend through the openings 50 of the flange 48. The tapered portion 93 bears on the glass cover 90, to hold the latter in place. Nuts 95 seated in the body 15 of the level engage the screws 94. Division lines 96 indicating degrees are marked on the tapered portion 93.

A worm 97a is indicated comprising the shanks 97 and 98. The shank 98 is in threaded engagement with the worm 97a as indicated at 99 and the worm and shanks are located in the opening 40. Each of said shanks 97 and 98 has formed therewith a recessed portion 101, and the head 102. The indentations 51 of the flange 48 register with the recessed portions 101, to prevent the worm 97a being detached from the shanks 97 and 98 when said worm turns.

In the body 15 of the level are securely located the bearings 105 having the pointed ends 106 to prevent their turning. The bearings 105 support the shanks 97 and 98 of the worm.

In the opening 21 of the body 15 is also located a supporting ring 110 similar to 45 and opposite thereto. The ring 110 has formed therewith the barrel portion 116 similar to 46 and has the opening 117 similar to 47. A flange 118 similar to 48 extends from the barrel portion 116 and has formed therein openings not shown similar to 49 and 120 similar to 50. Indentations 121 similar to 51 are formed in the flange 118, and pointed lugs 122, similar to 52 extend from the barrel portion 116. A flange 124 similar to 54 extends from the barrel portion 116, and has formed therein the four cut-outs 125 similar to 55 and the cut-out 126 similar to 56. The flange 118 of the ring 110 is located in the shouldered recess 23 of the opening 21, and is fastened in place by screws, not shown, similar to 58.

A sleeve similar to 60 is designated in its entirety by the numeral 130 and comprises the barrel portion 131 having an opening, not shown, similar to 62 and the elongated opening 133 similar to 63. Openings 134 elongated in a plane parallel to the faces 16 are formed in the barrel portion 131. A pointer 136 similar to 66 extends inwardly from the barrel portion 131. A flange 137 similar to 67 extends from one end of the barrel portion 131, and has formed in its periphery the worm teeth 138 similar to 68 and worm teeth 139 similar to 69. Oppositely positioned openings, not shown, similar to 70 and 71 are formed in the flange 137. The sleeve 130 is located in the supporting ring 110 with its flange 137 bearing on the flange 124. The sleeve 130 is located in place as described for the sleeve 60.

Brackets 145 and 146 similar to 75 and 76 are fastened to the barrel portion 131, by the bolt 147 and the rivet 148, respectively, similar to 77 and 78. The bolt 147 extends through the elongated opening 133 of the barrel portion 131, and the rivet 148 is fastened in place similarly to the rivet 78.

With the bracket 145 is formed a pair of split sleeves 149 similar to 79 which have each formed therewith the flange 150. With the bracket 146 is formed a pair of split sleeves 151 similar to 149, which have each formed therewith the flange 152. The sleeves 149 are supported in the openings similar to 134 of the barrel portion 131 and the sleeves 151 are supported in the openings 134 of the barrel portion 131. A curved spirit level tube 155 has its ends supported in the sleeves 149, and a curved spirit level tube 156 has its ends supported in the sleeve 151. The spirit level tubes 155 and 156 are normally at right angles with the spirit level tubes 85 and 86. The spirit level tube 155 has lines 158 formed on its outer surface and the spirit level tube 156 has lines 159 formed on its outer surface. A glass cover 160 is supported on the flange 137 of the sleeve 130. A ring 161 having the flat portion 162 having the openings 162a and the tapered portion 163 is located in the recess 23 of the opening 21, and is held in place by means of the screws 164, similar to 94, and which extend through the openings 120 of the flange 118. The bevelled portion 163 bears on the glass cover 160 to hold the latter in place. Nuts 165 similar to 95 are seated in the body portion 15 of the level engage the screws 164. Division lines, not shown, similar to 96 indicating degrees are marked on the tapered portion 163. A worm 166 is indicated comprising the shanks 167 and 168, respectively, similar to 98 and 97. Each of the shanks 167 and 168 is indicated with a recessed portion 171 and the head 172. The indentations 121 of the flange 118 register with the recessed portions 171 to prevent the shanks 167 and 168 becoming detached from the worm 166 when the latter turns. The worm 166 engages the teeth 139.

To assemble the parts of the level, the worm having the shanks 97 and 98 is located in the cross opening 40.

The supporting ring 45 is located in the opening 21 with its upper flange 48 seated in the annular recess 22 and fastened in place by means of the screws 58 engaging the openings 49.

The opening 47 is thereby positioned opposite the worm located in the cross opening 40. The sleeve 60 having the spirit level tubes 85 and 86 is located in the supporting ring 45, the flange 67 bearing on the lower flange 54, the openings 70 registering with the pointed lugs 52. The glass cover 90 is located upon the flange 67 of the sleeve 60. The ring 91 is now located in the annular recess 22, with the flat portion 92 bearing on the upper flange 48 and the lower edge of the tapered portion 93 is brought to bear on glass cover 90. The ring 91 is secured to the body 15 of the level, by means of the screws 94 engaging the openings 50 of the supporting ring 45 and the openings 92a of the flat portion 92. The screws 94 are in threaded engagement with the nuts 95.

In the opening 41 at the other end of the opening 21 of the body 15 of the level is assembled the worm 166 having the shanks 167 and 168. The supporting ring 110 is seated in the annular recess 23. The opening 117 is located opposite the opening 41. The sleeve 130 having the spirit level tubes 155 and 156 is located in the supporting ring 110. The glass cover 160 is brought to bear against the flange 137 of the sleeve 130. The ring 161 is now located in the annular recess 23, with the flat portion 162 bearing on the flange 118, and the lower edge of the tapered portion 163 is brought to bear on the glass cover 160. The ring 161 is secured to the body 15 of the level, by means of the screws 164 engaging the openings 120 of the supporting ring 110 and the openings 162a of the flat portion 162. The screws 164 are in threaded engagement with the nuts 165.

To adjust the level, the pointer 66 is brought in register with the zero mark of the division lines 96, by turning the worm 97a, and thereby turning the flange 67 having the worm teeth 68. The pointer 136 is brought in register with the 90 degree mark, not shown, on the tapered portion 163 of the ring 161.

To properly locate the spirit level tube 155, relatively to the spirit level tube 156, the elongated opening 133 is provided, which allows the movement of the bracket 146 relatively to the sleeve 130. To properly locate the spirit level tubes 85 and 86 relatively to each other similar steps are employed with the bracket 75, the opening 63 and the bolt 77.

It will be noted that the bottom face 18 may be used on the surface of the object to be leveled, and in which case the user observes the air bubble in the spirit level tube 156. When the top face 17 is used the user observes the air bubble in the tube 155. When the level is used as a plumb the end face 19 is used with the tube 85 or the end face 20 is used with the tube 86.

It will be noted that the sleeve 60 can be turned through an angle of 180 degrees so that the teeth 69 will engage the worm 97a. The sleeve 130 can also be turned to engage the teeth 138 with the worm 166.

It will also be noted that the sleeves 60 and 130 can also be initially placed in position, so that the teeth 69 will mesh with the worm 97a and the teeth 138 with the worm 166.

The spirit level tubes 155 and 156 are positioned so that their lines 158 and 159 will be clear of the spirit level tubes 85 and 86, and the spirit level tubes 85 and 86 are positioned so that their lines 87 and 88 will be clear of the spirit level tubes 155 and 156. By this disposition of the spirit levels, each pair is clear of the air bubbles of the other pair.

The glass 90 bearing on the flange 67 coacting with the ring 45 prevents the worm teeth 68 or 69 becoming disengaged from the worm 97, and the glass cover 160 bearing on the flange 137 coacting with the ring 110 prevents the teeth 139 or 138 becoming disengaged from the worm 166. The lugs 52 when spaced from the openings 70 also prevent the teeth 68 becoming disengaged from the worm 97a, and the lugs 122 function in the same manner to maintain the worm teeth 139 in mesh with the worm 166.

Various modifications may be made in the invention and the present exemplification is to be taken as illustrative and not limitative thereof.

Having described my invention what I desire to secure by Letters Patent and claim is:

1. In a level, the combination of a body having an opening extending therethrough, a pair of oppositely positioned sleeves supported in said opening, a flange at the outer end of each sleeve, worm teeth at the periphery of each flange, worms meshing with said worm teeth, a pair of spirit level tubes supported in each sleeve and means to turn said worms.

2. In a level, the combination of a body having an opening extending therethrough, a pair of oppositely positioned sleeves supported in said opening, a flange at the outer end of each sleeve, worm teeth at the periphery of each flange, worms meshing with said worm teeth, a pair of spirit level tubes supported in each sleeve, one pair at right angles to the other pair, means to turn said worms and means to maintain the worm teeth in mesh with said worms.

3. In a level, the combination of a body having an opening extending therethrough, a pair of oppositely positioned sleeves supported in said opening, a flange at the outer end of each sleeve, worm teeth at the periphery of each flange, worms meshing with said worm teeth, a pair of spirit level tubes supported in each sleeve, each pair of spirit levels positioned to provide clear visibility for the air bubbles of the other pair and means to turn said worms.

4. In a level, the combination of a body having an opening extending therethrough, supporting rings secured at the opposite ends of said opening and extending therein, each ring comprising a barrel portion with flanges at its ends, a pair of sleeves extending into said opening one at each end thereof, a flange at one end of each sleeve supported on the adjacent flange of its adjacent ring, worm teeth at the periphery of each of the latter flanges, worms in mesh with said worm teeth, means to turn the worms, a transparent cover bearing on each of the flanges having the worm teeth, a ring secured to each supporting ring and bearing on its adjacent transparent cover.

5. In a level, the combination of a body having an opening extending therethrough, a pair of oppositely positioned sleeves supported in said opening, a flange at the outer end of each sleeve, worm teeth at the periphery of each flange, worms meshing with said worm teeth, a bracket securely fastened to each sleeve, a second bracket adjustably fastened to each sleeve, a spirit level tube supported in each bracket and means to turn said worms.

6. In a level, the combination of a body having an opening extending therethrough, supporting rings supported at the opposite ends of said opening, each ring comprising a barrel portion, lugs extending inwardly from the barrel portion, an outer flange at one end of each barrel portion, an inner flange at the other end of each barrel portion, a pair of oppositely positioned sleeves in said opening, a flange at one end of each sleeve, one of the latter flanges bearing on the inner flange of one of said rings, the other flange of the other sleeve bearing against the inner flange of the other ring, a glass cover bearing against the flange of one of said sleeves, a glass cover bearing against the flange of the other sleeve, the lugs of the rings adapted to bear against said glass covers, spirit level tubes supported in the sleeves and means to turn the sleeves.

7. In a level the combination of a body having an opening extending therethrough, a supporting ring secured at one of the ends of said opening and extending therein, said ring comprising a barrel, an outer flange and an inner flange extending from said barrel, a pair of lugs extending from said barrel, a similar supporting ring secured at the other end of said opening and oppositely positioned to the first ring, a pair of oppositely positioned sleeves extending through the openings of said rings, a flange at one end of each sleeve bearing on the flange of its adjacent ring, the flange of each sleeve having two pairs of openings, an opening of each pair positioned diametrically opposite one of the openings of the other pair, and each pair of openings adapted to register with the lugs of its adjacent ring, teeth at the periphery of the flanges of the sleeves, a worm in mesh with the teeth of the flange of each sleeve, means to turn said worms, and a pair of spirit level tubes supported in each sleeve.

BARNET RUDOLFF.